United States Patent Office.

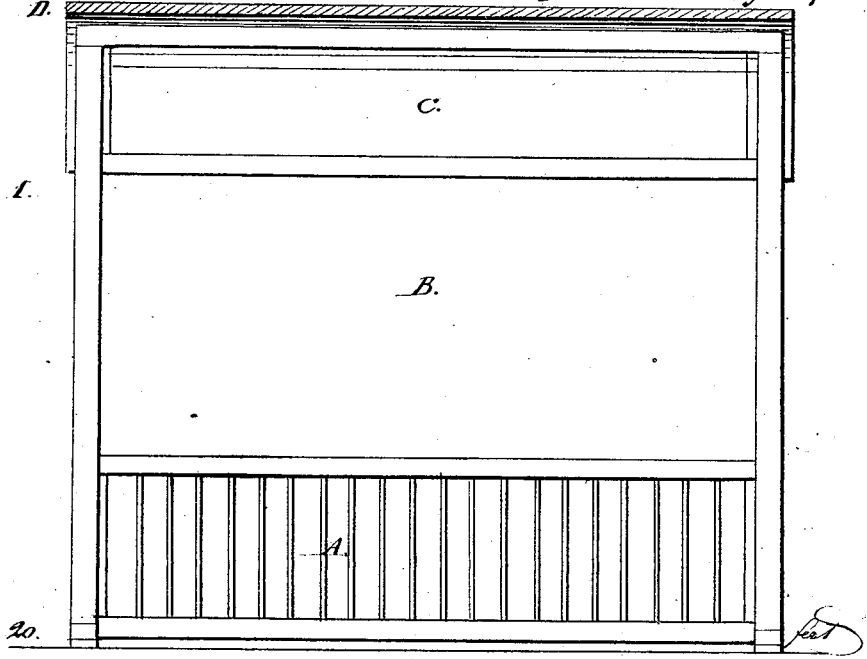
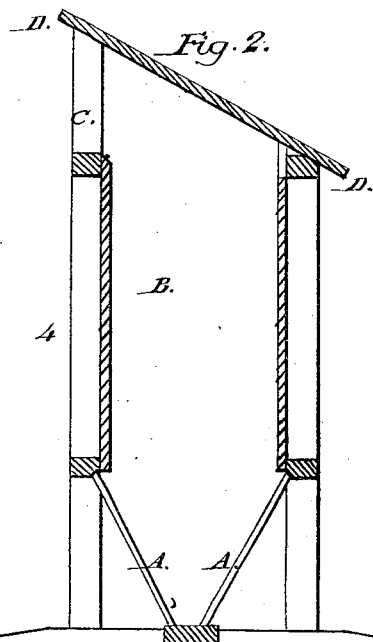

JOHN HARMAN, OF McCONNELLSVILLE, OHIO.

Letters Patent No. 68,191, dated August 27, 1867.

IMPROVEMENT IN SHEEP-RACK AND MOW COMBINED.

The Schedule referred to in these Letters Patent and making part of the same.

TO ALL WHOM IT MAY CONCERN:

Be it known that I, JOHN HARMAN, of McConnellsville, Morgan county, State of Ohio, have invented an "Improved Sheep-Rack and Mow Combined;" and I do hereby declare the following to be an exact description thereof, reference being had to the accompanying drawings and to the letters of reference marked the, making a part of this specification, in which—

Figure 1 represents a front elevation of the mow and rack.

Figure 2, a cross-section of the same.

The nature of my invention is the combination of a V-shaped rack, formed of wooden rollers or rounds, with a frame above, constructed with a sloping roof, and an opening across the whole length of the framework, which is built firmly as a mow to hold the hay required for a whole year for feeding sheep and keeping the hay nice and clean, and no waste below to collect and soil the sheep.

A represents the V-shaped rack, formed of rounds or rollers set endwise in a solid scantling, and of width apart sufficient to allow the hay to be drawn through by the sheep when feeding. Above this I have a frame box or mow, B, with an opening, C, along the whole front, and a slanting roof, D, inclining back, so as to preserve the hay from the weather. The length of the mow and rack is intended to be twenty feet long, eleven feet high, and four wide, so as to contain one ton of hay to feed thirty-five sheep for a year. The hay can be placed in the mow when newly cut, and the opening C at top allows free passage of air through the hay to keep it from moulding or souring, whilst the shape of the mow, corresponding with the length and width of the rack, allows the hay to settle into the rack as fast as the sheep empty the rack. Other racks require filling every day; this does not, and saves much time and labor. It can also be moved to any desirable location.

What I claim as my invention, and desire to secure by Letters Patent, is—

The construction and combination of the rack A and mow B and opening C, as herein described, and for the purposes set forth.

JOHN HARMAN.

Witnesses:
J. FRANKLIN REIGART,
JOHN S. HOLLINGSHEAD.